United States Patent [19]

Yasumiishi

[11] Patent Number: 4,709,500
[45] Date of Patent: Dec. 1, 1987

[54] VISUAL TIP

[76] Inventor: Calvin K. Yasumiishi, 1335 NE. 175th Ave., Portland, Oreg. 97230

[21] Appl. No.: 918,029

[22] Filed: Oct. 14, 1986

[51] Int. Cl.[4] ............................................. A01K 97/12
[52] U.S. Cl. ........................................... 43/24; 43/17; 43/25; 116/174
[58] Field of Search ........................ 43/24, 25, 16, 17; 116/173, 174, 175

[56] References Cited

U.S. PATENT DOCUMENTS 2,752,716  7/1956  Porter ...................................... 43/16
2,909,147 10/1959  Crowder ............................... 116/173
3,217,690 11/1965  Mihalisin .............................. 116/173
3,474,561 10/1969  McConkey ............................. 43/16
4,146,988  4/1979  Bednarczyk ............................ 43/17

Primary Examiner—Gene Crosby

[57] ABSTRACT

A tubular staff flagged at an end, composed of a fluorescent polyvinyl plastic, placed on the distal end of a fishing rod tip for the purpose of signaling a fish strike and aiding in the identification of the fishing rod tip from the surrounding background especially under dusky light conditions.

1 Claim, 3 Drawing Figures a sealed channel between said stationary part and said

VISUAL TIP

BACKGROUND AND SUMMARY OF THE INVENTION

This invention relates to a device used in the sport of fishing and provides an improved means of identifying a fish strike.

A number of devices exist in the sport of fishing which perform a fish strike indicating function. It is the object of this invention to provide an improved device, one which can be readily adapted and positioned on any fishing tip, for the purpose of identifying a fish strike.

Other objects and advantages of the invention will become subsequently apparent reside in the details of the description of the preferred embodiment hereinafter described and claimed.

BRIEF DESCRIPTION OF THE DRAWING

A preferred embodiment of the invention, not drawn to scale, has been selected for illustration, reference, and forms a part of the specification wherein.

DESCRIPTION OF THE PREFERRED EMBODIMENT

Figure 1:
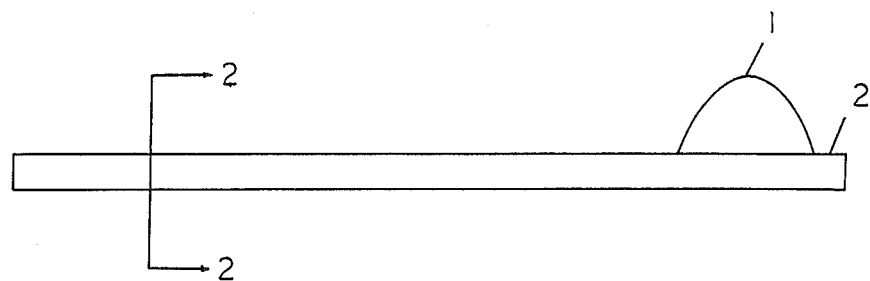
FIG. 1 is a side elevation of a preferred embodiment of the visual tip in accordance with the present invention.
Figure 2:
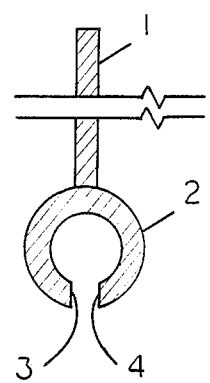
FIG. 2 is a sectional view taken along line 2—2 of FIG. 1.

The visual tip in accordance with the present invention is for use on a fishing rod tip. Referring more specifically to the drawings, a preferred embodiment of the visual tip is shown and is comprised of a staff 1 and flag 2. The flag 1 and staff 2 are formed of extruded polyvinyl plastic and are of uniform wall section (FIG. 2). The flag 1 is triangular in form (FIG. 1) and the staff 2 is of tubular form (FIG. 2). The staff 2 has a longitudinal seam formed by two edge portions 3 and 4, complimentary and mutually opposed, which extend the entire length of the staff 2 opposite the side having the flag as illustrated in FIG. 2.

Figure 3:
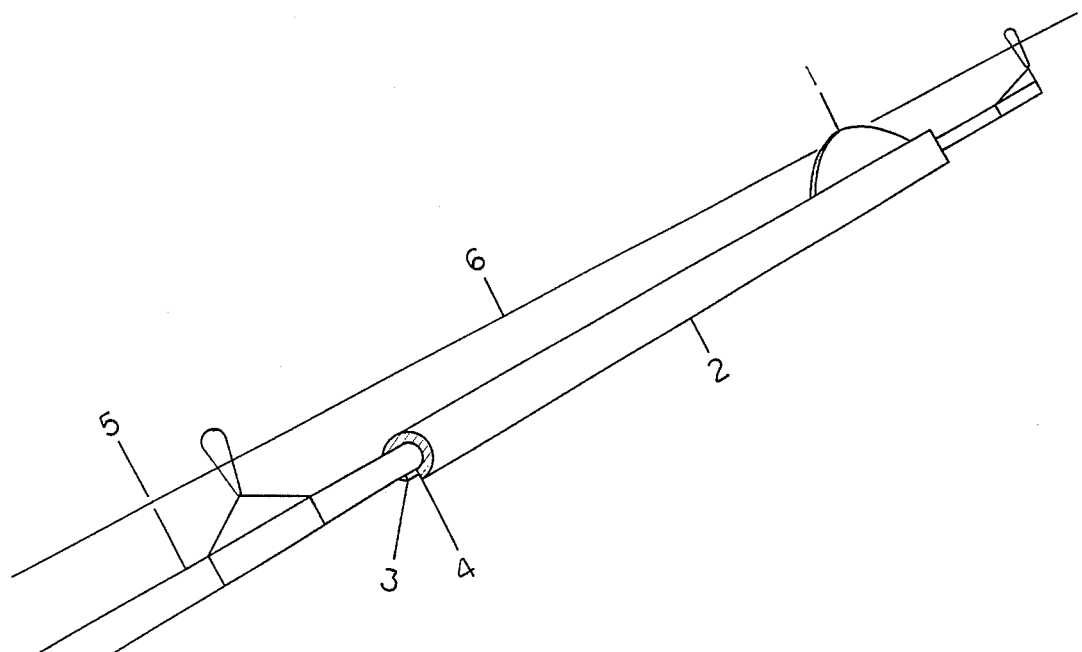
FIG. 3 is a perspective view of the visual tip assembly showing its position on the fishing rod tip.

The longitudinal seam is of less transverse width than the inside diameter of the staff 2 (FIG. 2). The elasticity of the polyvinyl plastic permits the staff 2 to be readily positioned, or removed, from the fishing rod tip 5 (FIG. 3) by forcing the fishing rod tip 5 through the longitudinal seam formed by edge portions 3 and 4. The elasticity of the plastic allows the edge portions 3 and 4 to sufficiently secure the staff 2 to the fishing rod tip 5, as illustrated in FIG. 3.

The visual tip can be readily seen under dusky light conditions enabling the fisherman to quickly recognize a fish strike. The visual tips simple and reliable construction allows it to be readily removed from the fishing rod tip 5 when the fish is being fought and replaced after the ensuing cast. If the fisherman desires to leave the visual tip on the fishing rod while fighting the fish, the plastic composition of the apparatus allows it to be left on the fishing rod tip 5 with little hazard to the fishing line (FIG. 3).

The foregoing description is illustrative only of the principles of the invention and therefore is not intended to limit the invention to the exact construction shown and described, and in accordance with provisions of the patent statutes, suitable modifications may be resorted to without departing from the spirit and scope of the invention.

Having thus described my invention, I claim:

1. A one piece fishing apparatus for use on a fishing rod tip for aiding in the signaling of a fish strike composed of, in combination, a flourescent polyvinyl plastic tubular staff of uniform cross section having a longitudinal seam formed by longitudinal edges mutually opposed, a flag of uniform cross section located on the distal end of the tubular staff, said flag mounted atop said tubular staff on one side opposite the longitudinal seam whereby the fishing apparatus can be quickly removed from or replaced upon the fishing rod intact.

* * * * *